United States Patent Office 2,846,453
Patented Aug. 5, 1958

2,846,453

A-RING-ACYLATED ESTRONE DERIVATIVES, AND CORRESPONDING ALCOHOLS, THEIR ESTERS, AND ETHERS

Willard M. Hoehn, Wilmette, Ill., assignor to G. D. Searle & Co., Chicago, Ill., a corporation of Delaware No Drawing. Application May 28, 1957
Serial No. 661,991

9 Claims. (Cl. 260—397.4)

This invention relates to A-ring acylated estrone derivatives, and corresponding alcohols, their esters, and ethers. More particularly, this invention relates to compounds of the formula

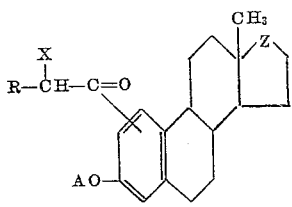

wherein R is hydrogen or a lower alkyl radical, X is hydrogen or halogen, Z is a hydroxymethylene or carbonyl radical, and A is hydrogen or a lower alkyl or aralkyl radical.

Among the lower alkyl radicals represented by R and A in the foregoing formula are methyl, ethyl, propyl, isopropyl, butyl, isobutyl, sec-butyl, tert-butyl, pentyl, isopentyl, tert-pentyl, neopentyl, hexyl, isohexyl, heptyl, and like $C_nH_{2n+1}$ radicals wherein $n$ is a positive integer amounting to less than nine. The aralkyl radicals comprehended by A in the formula include, for example, benzyl and phenethyl groupings; and as to the halogens designated by X, these are, of course, fluorine, chlorine, bromine, or iodine.

Also within the purview of the present invention are esters of the above-identified compounds wherein hydroxyl hydrogen in one or more of the positions 3, 17, and α has been replaced by such as lower alkanoyl radicals Lower alkyl-CO— benzoyl radicals, and/or, in general, radicals derived on removal of OH from the carboxyl group in organic acids.

The compounds to which this invention relates are useful because of their valuable pharmacological properties. Especially, the subject compositions are characterized by selective effects which, in the aggregate, are commonly associated with natural estrogens. These effects include lipodiatic activity, the capacity to decrease the serum concentration of cholesterol and the corresponding cholesterol/phospholipid ratio; osteotrophic activity, the proliferation of new bone, with corollary calcium retention; and sundry cardiovascular developments, for example, pressor-depressor response.

Manufacture of the claimed products proceeds as follows: An appropriate estratriene, for example, estradiol or estrone, is subjected to Friedel-Crafts acylation with a suitable acid halide or anhydride. A preferred catalyst is anhydrous aluminum chloride; and the reaction is desirably carried out in the presence of benzene, chlorobenzene, nitrobenzene, tetrachloroethane, carbon disulfide, or like solvent. When nitrobenzene or tetrachloroethane is the solvent employed, ether linkages present in the steroid starting material are left substantially intact; otherwise they are in part cleaved to give corresponding phenolic materials. The 2- and 4-acylestratrienes which result are converted to corresponding carbinols by reduction with, for example, alkali borohydride; and ester groupings are introduced by treatment with an acid halide or anhydride of choice, the latter under the influence of a basic catalyst such as pyridine. Etherification is achieved by interaction of a selected steroidal alkoxide and an alkyl or aralkyl halide or sulfate.

The following examples describe in detail certain of the compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (°C.), pressures in millimeters (mm.) of mercury, and relative amounts of materials in parts by weight, except as otherwise noted.

Example 1

17β - acetoxy - 2 - acetyl - 3 - hydroxyestra - 1,3,5(10)-triene and 2-acetylestra-1,3,5(10)-triene-3,17-diol.—To a solution of 5 parts of estradiol in 225 parts of chlorobenzene is added approximately 2 parts of acetyl chloride. The reactants are cooled to around 5° C., at which temperature 8 parts of aluminum chloride is cautiously introduced, with agitation. An oily precipitate shortly appears. The reaction mixture is allowed to warm to room temperatures with continued agitation, and maintained thus overnight. The mixture is next dumped onto crushed ice, following which the aqueous and organic layers are separated. The aqueous layer is extracted with ether; and the ether extract added to the organic layer, which is then washed with aqueous sodium bicarbonate and subsequently stripped of solvent by steam distillation. The residue is taken up in ether. The resultant solution is washed with water, and then dried over anhydrous sodium sulfate. Ether is removed by evaporation, leaving a residue which is taken to column chromatography on silica gel, using benzene and ethyl acetate as developing solvents. From an eluate comprising 5% ethyl acetate in benzene, there is obtained, on evaporation of solvent, a material which is washed by slurrying with benzene. This product is 17β - acetoxy - 2 - acetyl - 3 - hydroxyestra - 1,3,5(10)-triene which, dried in vacuo at 80° C., melts at 196-197° C. The material has the formula

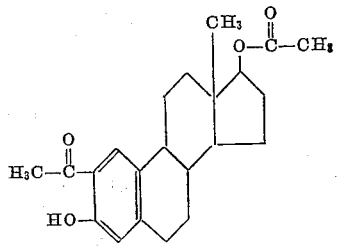

From the eluate comprising 10% ethyl acetate in benzene is obtained, on evaporation of solvent, a gummy residue which is extracted with anhydrous ether, leaving undissolved a small amount of crystalline estradiol. The extract is diluted with pentane, whereupon a precipitate deposits. The resultant mixture is heated, then cooled and freed of solvent by decantation. There remains a solid product which, washed by trituration with ether and thereafter crystallized from aqueous methanol, melts at 190–192° C. and gives a red 2,4-dinitrophenyl-hydrazone. The material thus obtained is 2-acetylestra-1,3,5(10)-triene-3,17β-diol, of the formula

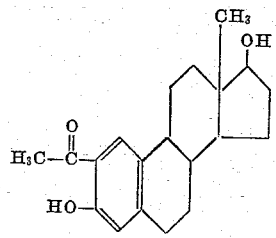

*Example 2*

*2 - acetyl - 17β - hydroxy - 3 - methoxyestra - 1,3,5 (10)-triene.*—To a solution of 3 parts of 17β-acetoxy-2-acetyl-3-hydroxyestra-1,3,5(10)-triene in 80 parts of methanol is added 5 parts of caustic soda dissolved in 25 parts of water. Sufficient dimethyl sulfate is next introduced to render the reaction mixture acid, following which the mixture is heated at the boiling point under reflux with agitation until crystalline material separates. During this heating period, alternate quantities of alkali and ester (q. s. a total of 55 parts of dimethyl sulfate) are added. The reaction mixture is chilled and diluted with water to complete precipitation, the product thus thrown down being the desired 2-acetyl-17β-hydroxy-3-methoxyestra-1,3,5(10)-triene, which melts in the range 160–167° C., resolidifies at slightly higher temperatures, and melts again at 185–186° C. The product has the formula

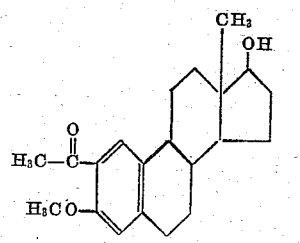

*Example 3*

*17β - acetoxy - 2 - acetyl - 3 - methoxyestra - 1,3,5 (10)-triene.*—To 2 parts of 2-acetyl-17β-hydroxy-3-methoxyestra-1,3,5(10)-triene is added a solution consisting of 20 parts of pyridine and 20 parts of acetic anhydride. The resultant mixture is warmed to about 55–60° C. and then allowed to stand at room temperatures overnight. The reaction mixture is dumped into approximately 150 parts of warm water, and the mixture thus obtained is cooled to room temperatures and then extracted with benzene-and-ether. The ether-benzene extract is consecutively washed with aqueous muriatic acid, aqueous sodium carbonate, and water. Upon evaporation of solvent, there remains as a residue 17β-acetoxy - 2 - acetyl - 3 - methoxyestra - 1,3,5(10)-triene, which melts at 185–186° C. and has the formula

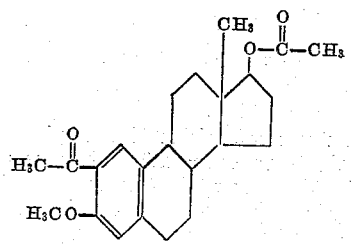

*Example 4*

*17β - acetoxy - 2 - acetyl - 3 - benzyloxyestra - 1,3,5 (10) - triene and 3,17β - diacetoxy - 2 - acetylestra-1,3,5(10)-triene.*—To approximately 9 parts of 17β-acetoxy - 2 - acetyl - 3 - hydroxyestra - 1,3,5(10)-triene dissolved in 120 parts of warm methanol is added 2 parts of sodium dissolved in 65 parts of methanol. There is then slowly added 7 parts of benzyl chloride. The resultant mixture is heated at the boiling point under reflux for 2 hours, following which it is dumped into 200 parts of water. An oily deposit of semi-crystalline material forms. After standing overnight at room temperatures, the precipitated mixture is concentrated in vacuo to slightly less than one-half its original volume, then diluted with 500 parts of water. Insoluble solids are filtered out and crystallized from aqueous methanol. The purified solids thus obtained are taken up in a mixture of 30 parts of pyridine and 30 parts of acetic anhydride. The resultant solution is let stand several days at room temperatures, then dumped into 500 parts of ice water, precipitating an oily solid which completely granulates within 2 hours. The solid product is filtered out and taken to column chromatography on silica gel, using benzene and ethyl acetate as developing solvents. From the eluate comprising 2% ethyl acetate in benzene there is obtained, on evaporation of solvent, a residue which, twice recrystallized from methanol, melts at 169–170° C. This material is 17β - acetoxy - 2 - acetyl - 3 - benzyloxyestra-1,3,5(10)-triene, of the formula

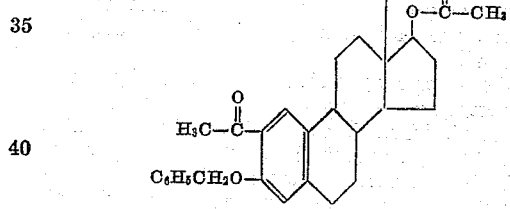

From the eluate comprising 5% ethyl acetate in benzene there is obtained, on evaporation of solvent, a residue which, preliminarily crystallized from a mixture of benzene and cyclohexane, and then recrystallized from cyclohexane alone, melts at 150–151° C. This material is 3,17β - diacetoxy - 2 - acetylestra - 1,3,5(10)-triene, of the formula

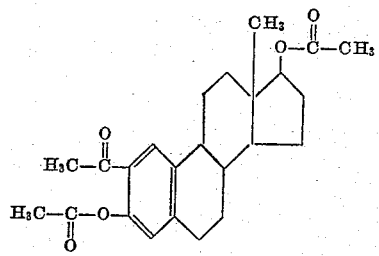

*Example 5*

*2 - acetyl - 3 - hydroxyestra - 1,3,5(10) - trien - 17-one and 2 - acetyl - 3 - methoxyestra - 1,3,5(10)-trien-17-one.*—To a solution of 11 parts of estrone 3-methyl ether in 400 parts of chlorobenzene at 0° C. is added, with agitation, approximately 4 parts of acetyl chloride. The temperature is maintained between 0° and 5° C. while 17 parts of aluminum chloride is cautiously introduced—and with continued agitation. The reaction mixture is allowed to stand at room temperatures overnight, then dumped into a mixture of ice and water. The resultant mixture is extracted with ether; and the ether extract thus obtained is consecutively washed with water, aqueous sodium bicarbonate, and water. The extract is next dried over anhydrous sodium sulfate, and then stripped of solvent by evaporation. The residue is subjected to column chromatography on silica gel, using benzene and ethyl acetate as developing solvents. From an eluate comprising 5% ethyl acetate in benzene there is obtained, on evaporation of solvent, a residue which, recrystallized from a mixture of dichloromethane and methanol, and then carefully dried at 80° C. under 0.03 mm. pressure, melts at 162–163° C. This material is 2-acetyl - 3 - hydroxyestra-1,3,5(10)-trien-17-one, of the formula

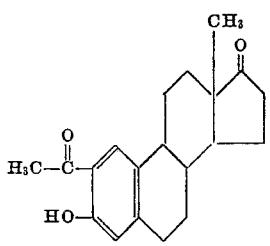

Likewise from an eluate comprising 5% ethyl acetate in benzene, but retained somewhat longer on the column, there is obtained, on evaporation of solvent, a residue which is also purified by crystallization from a mixture of dichloromethane and methanol, this material being 2-acetyl-3-methoxyestra-1,3,5(10)-trien-17-one, melting at 183–184.5° C. The product has the formula

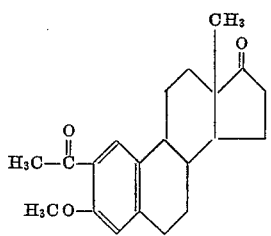

*Example 6*

2 - chloroacetyl - 3 - methoxyestra - 1,3,5(10)-trien-17 - one and 4 - chloroacetyl - 3 - methoxyestra - 1,3,5(10)-trien-17-one.—To a solution of 30 parts of estrone 3-methyl ether in 115 parts of nitrobenzene and 385 parts of chlorobenzene is added 51 parts of chloroacetyl chloride. The resultant solution is cooled to between 8° and 12° C., in which temperature range there is cautiously added, with agitation, 80 parts of aluminum chloride. Agitation is continued for 3 hours, following which the reactants are let stand at room temperatures for 48 hours, then dumped onto 800 parts of crushed ice. The aqueous layer which separates is decanted and extracted with ether, the resultant extract being added to the residual organic layer. The resultant solution is washed repeatedly with water, aqueous sodium bicarbonate, and water again, in that order, until the final aqueous washings are substantially free of acid (pH 5–6). Ether and chlorobenzene are evaporated in vacuo, and the residual nitrobenzene is removed by steam distillation. Water is removed from the distill and by decantation, leaving a gummy residue which is taken up in dichloromethane. Approximately 120 parts of methanol is introduced, and the dichloromethane is evaporated. Precipitation of crystalline solids takes place. The material thus thrown down is filtered off and recrystallized from a mixture of dichloromethane and methanol, yielding 2-chloroacetyl-3 - methoxyestra - 1,3,5(10)-trien-17-one, melting at 182–183.5° C. The product has the formula

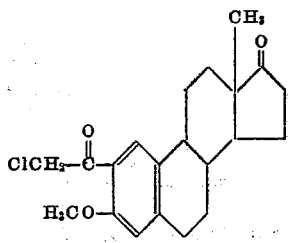

The filtrate deriving from isolating of crystalline solids following evaporation of dichloromethane (but not including recrystallization mother liquors) is stripped of solvent by distillation, yielding a residue which is chromatographed on silica gel, using benzene and ethyl acetate as developing solvents. From an eluate comprising 1% ethyl acetate in benzene, there is obtained, on evaporation of solvent, a residue which, crystallized from a mixture of dichloromethane, methanol, and water, melts at 129–130° C. This material is 4-chloroacetyl-3-methoxyestra-1,3,5(10)-trien-17-one, of the formula

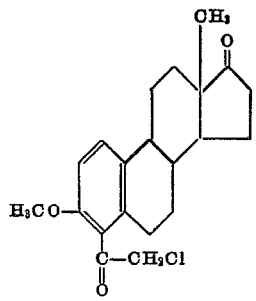

From an eluate comprising 2–5% ethyl acetate in benzene there is obtained an additional crop of 2-chloroacetyl-3-ethoxyestra-1,3,5(10)-trien-17-one.

What is claimed is:

1. A compound of the formula

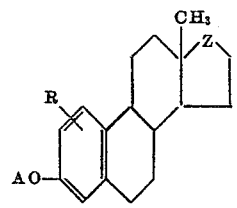

wherein R is selected from the group consisting of acetyl and chloroacetyl radicals ortho to the oxy linkage in ring A; Z is selected from the group consisting of oxo, hydroxymethylene, and (lower alkanoyl) oxymethylene radicals; and A is selected from the group consisting of hydrogen and lower alkyl and benzyl radicals.

2. A compound of the formula

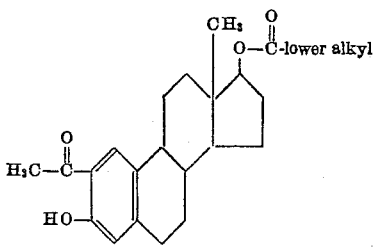

3. 17β - acetoxy - 2 - acetyl - 3 - hydroxyestra - 1,3,5(10)-triene.

4. A compound of the formula
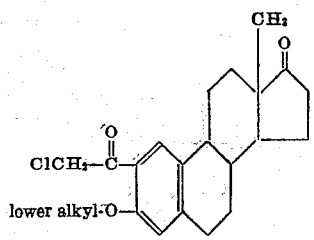
5. 2 - Chloroacetyl - 3 - methoxyestra - 1,3,5(10)-trien-17-one.
6. A compound of the formula
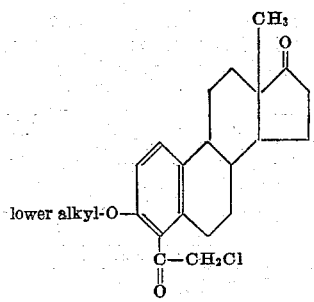
7. 4 - chloroacetyl-3-methoxyestra - 1,3,5(10)-trien-17-one.
8. 2-acetylestra-1,3,5(10)-triene-3,17β-diol.
9. 2-acetyl-3-hydroxyestra-1,3,5(10)-trien-17-one.
No references cited.

UNITED STATES PATENT OFFICE
CERTIFICATE OF CORRECTION

Patent No. 2,846,453                                                August 5, 1958

Willard M. Hoehn

It is hereby certified that error appears in the printed specification of the above numbered patent requiring correction and that the said Letters Patent should read as corrected below.

Column 1, line 49, for "Lower alkyl-CO-" read -- lower alkyl-CO- --; column 5, line 69, Example 6, for "distill and" read -- distilland --; column 6, line 42, for "3-ethoxyestra" read -- 3-methoxyestra --.

Signed and sealed this 11th day of November 1958.

(SEAL)
Attest:

KARL H. AXLINE                                    ROBERT C. WATSON
Attesting Officer                                 Commissioner of Patents